(12) United States Patent
Sabeur et al.

(10) Patent No.: US 12,532,384 B2
(45) Date of Patent: Jan. 20, 2026

(54) DEVICE INFORMATION DETERMINATION FOR ANONYMOUS CALLS

(71) Applicant: T-Mobile USA, Inc., Bellevue, WA (US)

(72) Inventors: Nassereddine Sabeur, Bellevue, WA (US); Raymond Thomas Ball, Seattle, WA (US); Hichem Zait, Bellevue, WA (US); Joel Arends, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 666 days.

(21) Appl. No.: 17/956,306

(22) Filed: Sep. 29, 2022

(65) Prior Publication Data

US 2024/0114593 A1    Apr. 4, 2024

(51) Int. Cl.
*H04L 12/26* (2006.01)
*H04L 5/00* (2006.01)
*H04L 69/22* (2022.01)
*H04W 76/11* (2018.01)
*H04W 76/50* (2018.01)

(52) U.S. Cl.
CPC ........... *H04W 76/50* (2018.02); *H04L 5/0048* (2013.01); *H04L 69/22* (2013.01); *H04W 76/11* (2018.02)

(58) Field of Classification Search
None
See application file for complete search history.

(56) References Cited

U.S. PATENT DOCUMENTS

2011/0159861 A1*  6/2011  Pratt ............... H04W 12/02
                                                    455/417

FOREIGN PATENT DOCUMENTS

WO    WO-2018080243 A1 *  5/2018  ............. H04W 4/16

* cited by examiner

*Primary Examiner* — Zewdu A Beyen
(74) *Attorney, Agent, or Firm* — Lee & Hayes, P.C.

(57) ABSTRACT

Techniques for determining contact information for an anonymous device on a telecommunications network are described herein. The telecommunications network can implement a server to determine data representing a callback number or other subscriber information for a user equipment (UE) associated with an anonymous status. The server can generate a request for the data based on identifying an anonymous status associated with a message from the UE. The server can request the data from a gateway mobile location center (GMLC) of the telecommunications network using a Representational State Transfer (REST) interface. The server can establish a communication session for the UE by sending the callback number and/or the subscriber information to an emergency service center (e.g., to enable a Public Service Answering Point to communicate with the UE if the communication session is lost).

17 Claims, 7 Drawing Sheets

DEVICE INFORMATION DETERMINATION FOR ANONYMOUS CALLS

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

Telecommunication systems can be associated with different telecommunication service providers. A mobile device can be considered a roaming device when it operates on a network of a telecommunication service provider that is different from the telecommunication service provider with which the device is registered (e.g., pays a fee to receive service). To process a call and/or text while roaming, the telecommunication service provider hosting the roaming device may forward the call to the "home" telecommunication service provider with which the roaming device is registered. In the context of an emergency communication, the "home" telecommunication service provider is responsible for registering the device. However, in examples when the roaming device sends a communication requesting emergency service, the "home" telecommunication service provider is unable to send the communication to an emergency service provider so the host telecommunications service provider configures the communication for sending to the emergency service provider as an anonymous call.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
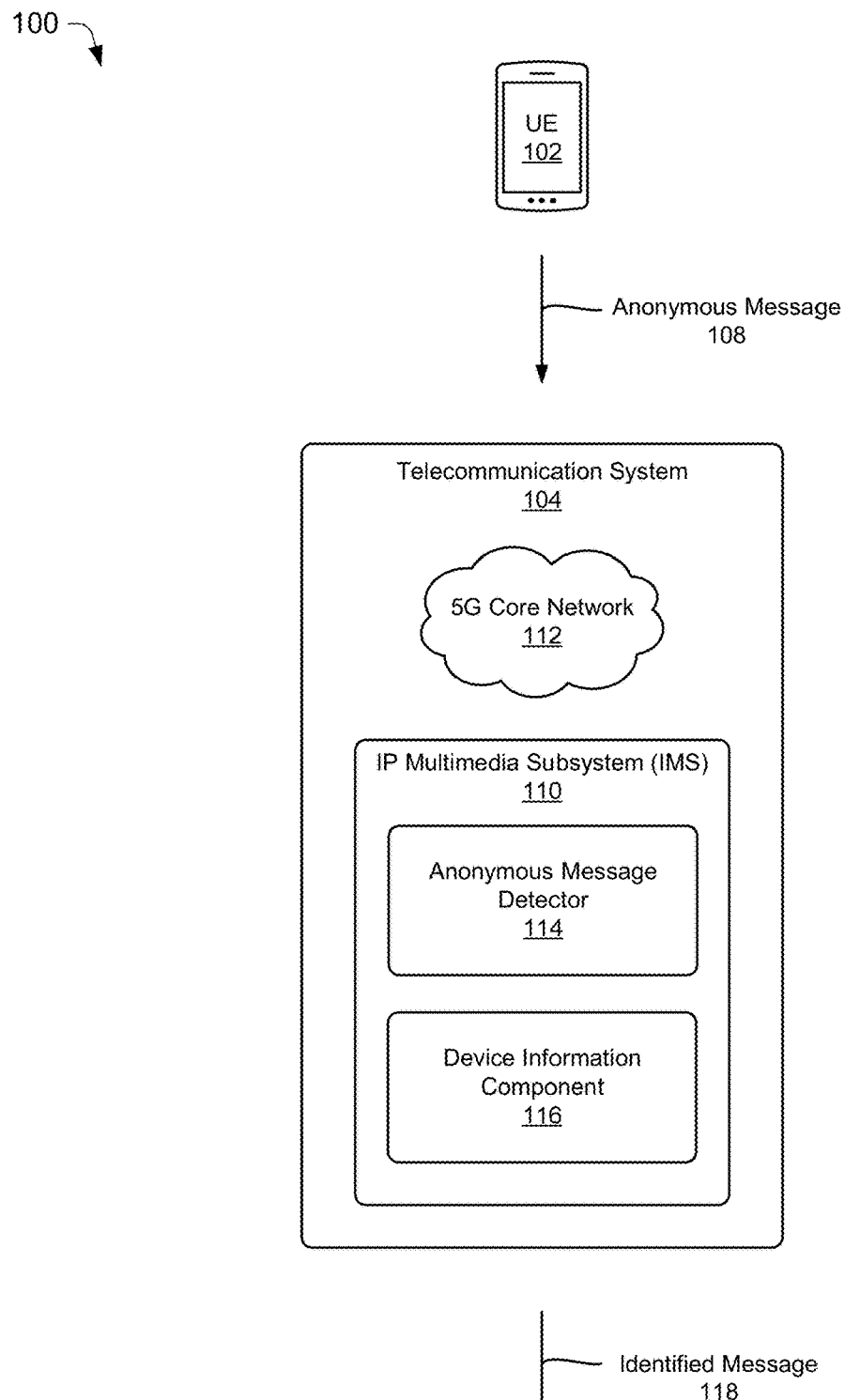
FIG. 1 depicts an example network environment in which an example user equipment can connect to a telecommunication system that includes an example server to implement the techniques described herein.

This application describes techniques for determining contact information for an anonymous device operating on a telecommunications network. For example, a server can identify that a user equipment (UE) associated with an anonymous status is trying to establish a communication session (e.g., an anonymous emergency call or an anonymous non-emergency call) with another UE. The server (e.g., a Proxy Call Session Control Function (PCSCF) or other component of an of an Internet Protocol (IP) Multimedia Subsystem (IMS)) can generate a request for data representing contact information (e.g., a phone number, subscriber information, etc.) based at least in part on identifying the anonymous status of the UE. The server can send the request to a gateway mobile location center (GMLC) of the telecommunications network using a Representational State Transfer (REST) interface. The server can append the contact information received from the GMLC to one or more other messages that establish the communication session with the other UE. In this way, the contact information is available to the other UE in examples when the communication session ends unintentionally.

Generally, the techniques described herein can include appending callback information with a communication originating by an anonymous device (e.g., a roaming device or a device that is unable to register with an IMS). If a telecommunication network establishes a call between an anonymous UE and an emergency service center, then the emergency service center will be unable to reach the anonymous UE in the event that the call prematurely disconnects. The techniques described herein include determining callback information for the anonymous UE before finishing a call setup process (e.g., before establishing a communication session). In this way, the UE can be reached during an emergency by including the contact information during the call setup process thereby improving customer service.

By way of example and not limitation, the techniques can include providing contact information for a UE to a Public Service Answering Point (PSAP) instead of the PSAP receiving an anonymous emergency call. By using a REST interface to request and receive contact information, the server can obtain contact information for sending to the PSAP that is usable to initiate a call to the UE in case the UE inadvertently disconnects during the emergency call.

Calls initiated by a UE can be associated with an anonymous status for a variety of reasons. For example, an anonymous status may be associated with an emergency call from a UE that is roaming on a host telecommunications network. That is, a roaming UE registers with a home telecommunications network and therefore does not provide a phone number to the IMS of the host telecommunications network. Thus, in conventional systems, the IMS of the host telecommunications network assigns the roaming UE with the anonymous status when setting up a call (e.g., a communication session) to indicate that the phone number of the roaming UE is unknown. Further, an anonymous status may also be associated with a call from a UE that is unable to register (or authenticate) with an IMS due to a network problem (e.g., registration with the IMS is unavailable), or other reason. For instance, a UE that is not roaming may be considered an anonymous device during a call setup process due to the IMS being unable to determine a phone number for the UE.

The techniques described herein can include obtaining device information such as a device identifier, a subscriber identifier, or the like, and including the device information in a header and/or over an interface associated with a message that is part of the call setup process. By implementing the techniques described herein, a server of the IMS can determine and provide device information to end users (e.g., another UE, a PSAP, etc.) as part of a call setup process that otherwise would receive an indication that the device originating the call is anonymous. In examples when a roaming UE makes an emergency call to an emergency service center, for example, callback information is provided by the server to enable a device of the emergency service center to call the roaming UE after being disconnected prematurely. Thus, implementing the device information determination techniques can improve UE access to emergency services and allow unregistered UEs to make calls without being anonymous.

As mentioned, if a call is established between an anonymous UE and an emergency service center, the emergency service center will be unable to reach the anonymous UE in the event that the call is prematurely disconnected (e.g., loss of signal, unintentionally selecting 'end' on the anonymous UE, etc.). The techniques of this application enable determining callback information for the anonymous UE before finishing the call setup process. For instance, by using a REST interface to query a GMLC, a PCSCF can determine callback information for use in a call setup process. In this way, examples in which the UE is unable to be reached in an emergency can be reduced leading to improved customer service and network reliability.

In various examples, an IMS can intercept, detect, identify, or otherwise determine an anonymous call initiated by a UE operating on the telecommunication network. Based on identifying that the call is associated with an anonymous status, the server can generate a message requesting device information (e.g., a unique device identifier for the UE such as a contact number) for sending to another component of the telecommunication network. For instance, a PCSCF of the IMS can send a request for a UE identifier (e.g., a Mobile Station Integrated Services Digital Network (MSISDN)) and/or a subscriber identifier (e.g., an International Mobile Subscriber Identity (IMSI)) to a GMLC. In such examples, the PCSCF can send the request for the device information to the GMLC using a REST interface. Upon receiving the UE identifier and/or the subscriber identifier from the GMLC, the PCSCF can configure an invite message to associate, append, or otherwise include the device information (e.g., the MSISDN and IMSI) in a P-Asserted ID (PAI) header. The invite message with the PAI header can be sent to at least one of: an emergency call session control function (ECSCF) server to establish an emergency call with an emergency service center, or a call session control function (CSCF) server to establish a non-emergency call with another UE. By accessing the UE identifier and/or the subscriber identifier from the GMLC, the PCSCF can provide information that enables a callback to the UE by the emergency service center (or other destination of the anonymous call from the UE).

In some examples, a system can implement a server that is configured to determine device information for an anonymous UE that initiates a call to another UE. For instance, the system can implement a server, or other computing device, to generate a request for device information based on detecting that the UE is anonymous (e.g., not associated with contact information). In such examples, the system can use a REST interface to exchange data representing the device information with a GMLC. The system can also or instead be configured to transmit the device information over a network in a header (e.g., a PAI header, and so on) of a call setup message (e.g., an invite message, OK message, etc.) to a terminating device. For example, the system can associate a roaming device (e.g., a device operating outside a coverage area served by a telecommunication service provider with which the device is registered) with the device information when routing a communication from the roaming device to a device associated with a Public Agency (Police, Fire, Medical Services, etc.). Accordingly, the roaming device is identifiable by the Public Agency to establish future communications. In various examples, the anonymous UE (roaming deice or UE unable to register with an IMS) can include a user equipment (UE), an Internet of Things device, a Machine to Machine device, a vehicle computing device, an unmanned aerial vehicle device, and so on.

The techniques described herein can enable secure data exchange between two or more UEs over a core network including initiating, establishing, maintaining, or otherwise determining a message that includes device information (e.g., contact data, subscriber data, etc.) rather than an anonymous status. A server associated with a core network (e.g., a 5G core network) can determine the device information during an initial call setup process and provide the device information to a terminating UE to identify an originating UE. Further description of device information determination can be found throughout this disclosure including in the figures below.

FIG. 1 depicts an example network environment 100 in which an example user equipment can connect to a telecommunication system that includes an example server to implement the techniques described herein. For example, a UE 102 can connect to a telecommunication system 104 to engage in communication sessions for voice calls, video calls, messaging, data transfers, or other types of communications with another UE 106. In some examples, the UE 102 can send an anonymous message 108 to an IMS 110 of the telecommunication system 104. The anonymous message 108 can be sent from the UE 102 to the IMS 110 over a fifth generation (5G) core network 112 for processing by an anonymous message detector 114 and a device information component 116. The IMS 110 can represent a server that provides functionality as described herein including generating an identified message 118 that identifies device information of the UE 102. For instance, the IMS 110 can associate device information (e.g., device identity such as a phone number, subscriber identity, etc.) with the anonymous message 108 to generate the identified message 118. By implementing the IMS 110 as described herein, the telecommunication system 104 can establish a communication session between the UE 102 and the UE 106 that includes an identity of the UE 102 (rather than remaining anonymous).

In some examples, the IMS 110 can implement the anonymous message detector 114 and the device information component 116 to detect, generate, identify, or otherwise determine callback information for association with a message originating by the UE 102 (e.g., an anonymous device). In some examples, the IMS 110 can intercept a message requesting a communication session from the UE 102 and determine that the message is received from an anonymous UE. The IMS 110 can, for instance, append the callback information to a call setup instruction (e.g., an INVITE message) sent to the UE 106 while establishing the communication session. In examples when the communication session is disconnected after being established, the UE 106 can use the device information to initiate another communication session with the UE 102 which would otherwise not be possible due to the UE 102 operating anonymously on the 5G core network 112.

The UE 102 and/or the UE 106 represent any device that can wirelessly connect to the telecommunication system 104, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, a vehicle, a machine-to-machine device, an unmanned aerial vehicle (UAV), an internet-of things (IOT) device, or any other type of computing or communication device. An example architecture for the UE 102 is illustrated in greater detail in FIG. 7. In examples when the UE 106 represents a device associated with an emergency service center (e.g., a 911 center), the techniques described herein can enable the emergency service center to contact the UE 102 in case of a lost connection thereby improving response to a medical event, a crime in progress, a natural disaster, and so on.

In various examples, the telecommunication system 104 can represent functionality to exchange messages between the UE 102 and the UE 106, and can include one or more radio access networks (RANs), as well as one or more core networks linked to the RANs. For instance, the UE 102 can wirelessly connect to a base station or other access point of a RAN, and in turn be connected to the core network(s). The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi® technology, and/or any other previous or future generation of radio access technology. In this way, the telecommunication system 104 is compatible to operate with other radio technologies including those of other service providers (e.g., the telecommunications system 104). Accordingly, a message (e.g., the anonymous message 108) from the UE 102 may be processed by the telecommunication system 104 independent of the technology used by the UE 102.

In some examples, the UE 102 can generate the anonymous message 108 (e.g., voice, text, and/or video) that includes a connection request to the UE 106 (e.g., an emergency service center providing Fire, Police, and/or Medical response to an emergency event or other UE). In some examples, the anonymous message 108 can represent a call to the UE 106 while the UE 102 is roaming (e.g., receiving service outside an area of a home telecommunications system) and thus be associated with an anonymous status. Alternatively, the anonymous message 108 can represent an anonymous call due to the UE 102 being unable to register with the IMS 110 of the telecommunication system 104 due to a network problem (e.g., registration with the IMS is unavailable), or other reason. Whether roaming or not being able to register, the UE 102 sending the anonymous message 108 represents a message that is associated with an anonymous status (e.g., the identity of the UE 102 is unknown).

The IMS 110 is configured to establish a communication session between the UE 102 and the UE 106. The communication session can include one or more of: a transmission control protocol (TCP), an internet protocol (IP), a user datagram protocol (UDP), a simple mail transport protocol (SMTP), a file transfer protocol (FTP), a hypertext transfer protocol (HTTP), or a hypertext transfer protocol secure (HTTPS), just to name a few. Based on receiving the device information from the device information component 116, the IMS 110 can generate the identified message 118 with the device information for sending to the UE 106.

In some examples, the telecommunication system 104 can determine that the UE 102 is a roaming device based at least in part on the network identifier associated with the anonymous message 108, and generate a request for device information (e.g., phone number, registration information, subscriber information, and other information associated with the UE 102). By implementing the techniques described herein, the IMS 110 can initiate, identify, or otherwise determine the device information usable for contacting the UE 102 when the UE 102 is roaming on the telecommunication system 104. Additional detail for determining the device information is discussed throughout this disclosure including in the descriptions of the other figures.

In some examples, the 5G core network 112 can represent a service-based architecture that includes multiple types of network functions that process control plane data and/or user plane data to implement services for the UE 102. In some examples, the services comprise a text, a data file transfer, an image, a video, a combination thereof, and so on. The network functions of the 5G core network 112 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 2, and elsewhere.

The anonymous message detector 114 can represent functionality to identify, detect, or otherwise determine that the UE 102 is an anonymous device. For instance, the anonymous message detector 114 can receive network information, subscriber information, or other information as part of the anonymous message 108 usable to determine that the UE 102 is associated with an anonymous status. Based on detecting that the UE 102 is associated with the anonymous status, the anonymous message detector 114 can initiate and/or generate request(s) for device information from the device information component 116. For instance, the anonymous message detector 114 can send a request to the device information component 116 using a REST interface. Functionality of the anonymous message detector 114 can be included in a PCSCF or another component of the IMS 110.

In various examples, the anonymous message detector 114 can receive the device information of the UE 102 from the device information component 116 (or other network element) based at least in part on the request. The REST interface may be used to receive the device information while also providing an indication to the UE 102 that such information is to be included in a future call setup message. In various examples, the IMS 110 can append the device information to the anonymous message 108 to generate the identified message 118.

The device information component 116 can represent functionality to generate, modify, store, or otherwise determine the device information including one or more of a phone number, registration information, subscriber information, etc. In various examples, functionality of the device information component 116 can be performed by a GMLC or other component that is part of, or separate from, the IMS 110. Upon receiving the request for the device information from the anonymous message detector 114, the device information component 116 can identify a type of information requested in the REST interface. For example, the device information component 116 can access the device information from a memory and/or database of the telecommunication system 104 and send the device information to one or more other components of the telecommunication system 104 to complete the call setup.

As can be understood, the components discussed herein (e.g., the IMS 110, the anonymous message detector 114, and the device information component 116) are described as divided for illustrative purposes. However, the operations performed by the various components may be combined or performed in any other component. While examples are given in which the techniques described herein are implemented by an IMS of the telecommunication system 104, in some examples, some or all of the techniques described herein could be implemented by another system of the telecommunication system 104, such as a server or computing device different from the IMS.

Figure 2:
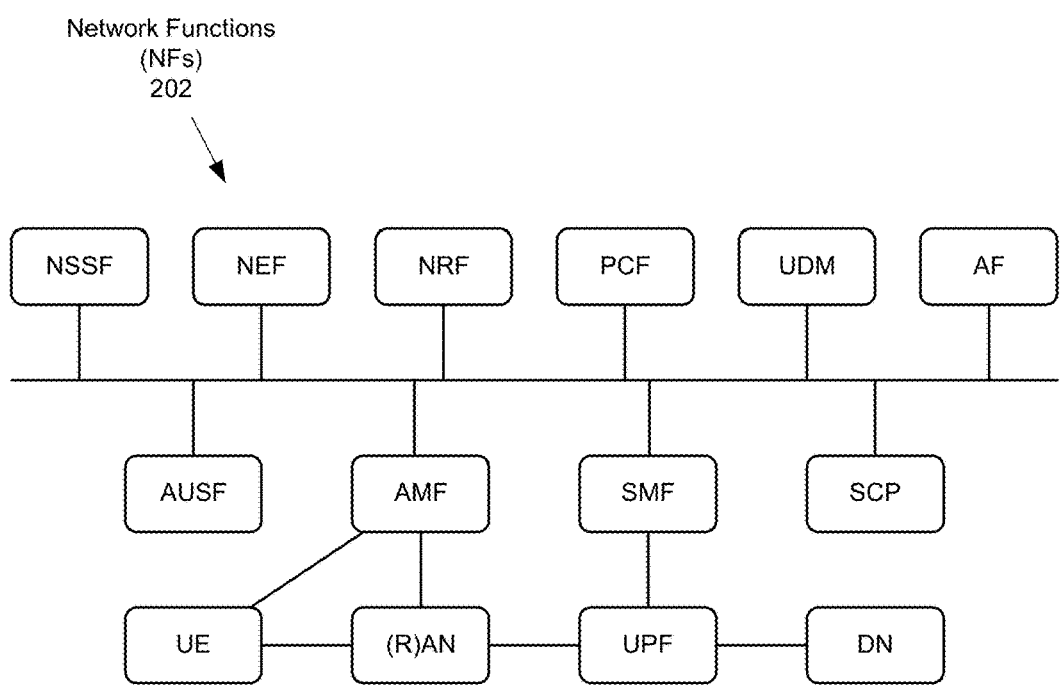
FIG. 2 depicts an example system architecture for a fifth generation (5G) telecommunication network.

FIG. 2 depicts an example system architecture 200 for a fifth generation (5G) telecommunication network. In some examples, the telecommunication network can comprise the 5G core network 112 in FIG. 1 that includes a service-based system architecture in which different types of network functions (NFs) 202 operate alone and/or together to implement services. Standards for 5G communications define many types of NFs 202 that can be present in 5G telecommunication networks (e.g., the 5G core network 112), including an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G core network 112 can be implemented as network applications that execute within containers (not shown). The NFs 202 can execute as hardware elements, software elements, and/or combinations of the two within telecommunication network(s), and accordingly many types of NFs 202 can be implemented as software and/or as virtualized functions that execute on cloud servers or other computing devices. Network applications that can execute within containers can also include any other type of network function, application, entity, module, element, or node.

Figure 3:
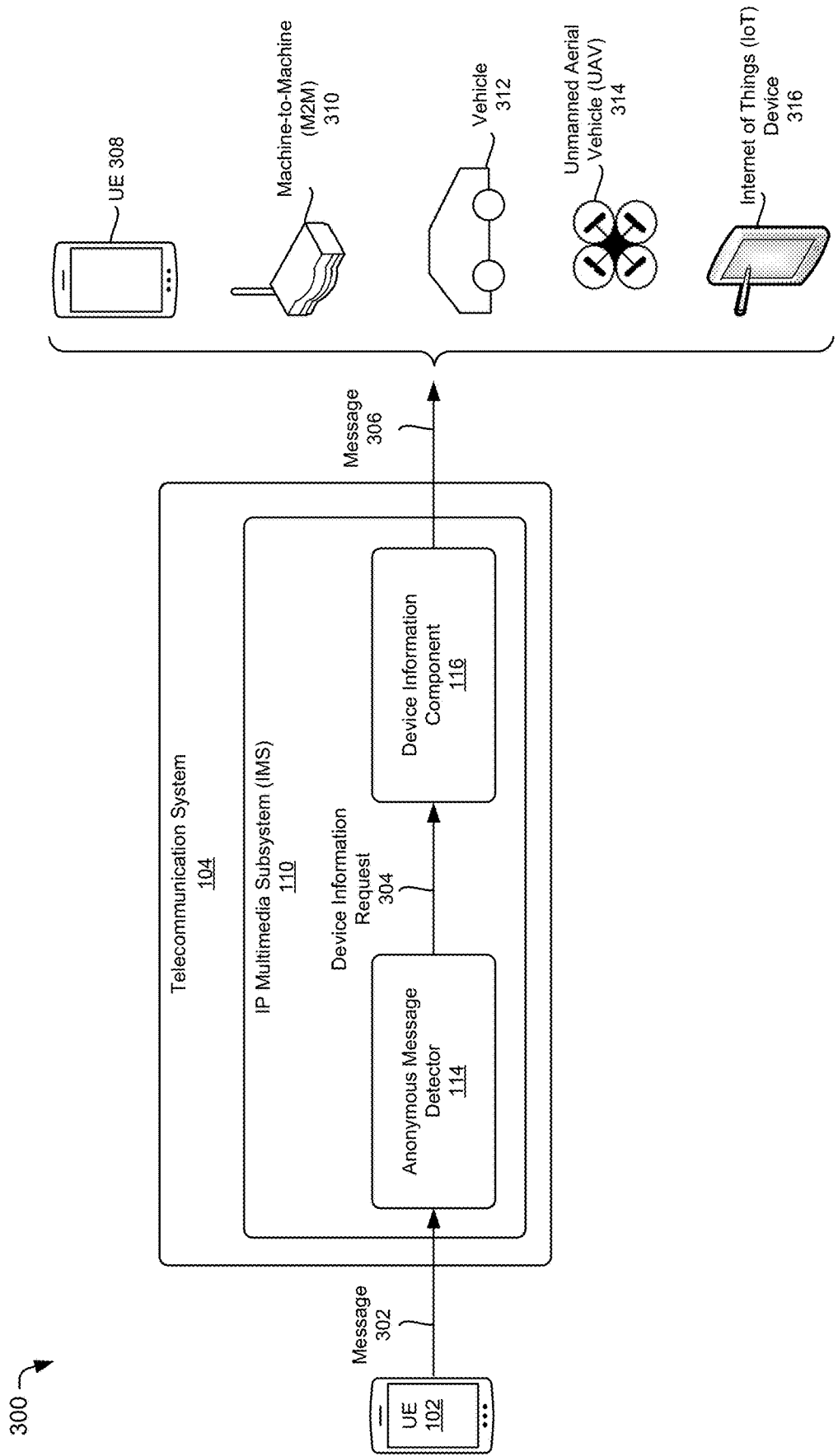
FIG. 3 depicts another example network environment in which an example user equipment can connect to a telecommunication system that includes an example server to implement the techniques described herein.

FIG. 3 depicts another example network environment 300 in which an example user equipment can connect to a telecommunication system that includes an example IMS to implement the techniques described herein. For example, the UE 102 can connect to the telecommunication system 104 using the 5G core network 112 to send a message 302 representing a request to establish a communication session to the IMS 110. The message 302 can be considered an anonymous message and/or a message associated with an anonymous UE.

In some examples, the anonymous message detector 114 can configure a device information request 304 for sending to the device information component 116 based at least in part on detecting that the message 302 is associated with an anonymous UE (e.g., the UE 102). The device information request 304 can represent a query message over a REST interface for an MSISDN, an IMSI, or another identifier of the UE 102 suitable for identifying and/or contacting the UE 102. Though described in the context of the REST interface, other interface types may also be used.

The IMS 110 can implement the anonymous message detector 114, the device information component 116, and/or another component to generate a message 306 with the device information for sending to a receiving device that includes at least one of: a UE 308, an M2M 310, a vehicle 312, a UAV 314, or an IoT device 316. For example, the UE 102, the IMS 110, and the receiving device can exchange Session Initiation Protocol (SIP) messages to set up and manage individual communication sessions. Further discussions of exchanging a SIP message are included throughout this disclosure including in FIG. 5.

In various examples, the message 306 can represent a call setup request that includes a phone number or other callback information suitable for contact the UE 102 in examples when am initial communication session terminates. In examples when the anonymous message detector 114 represents a PCSCF, the PCSCF can configure an invite message for the receiving device by associating or appending the device information (e.g., the MSISDN and IMSI) in a P-Asserted ID (PAI) header. In such examples, the invite message with the PAI header can be sent to at least one of an emergency call session control function (ECSCF) server to establish an emergency call with an emergency service center, or a call session control function (CSCF). The ECSCF or the CSCF can transmit the invite message with the device information (e.g., the message 306) to the receiving device.

Figure 4:
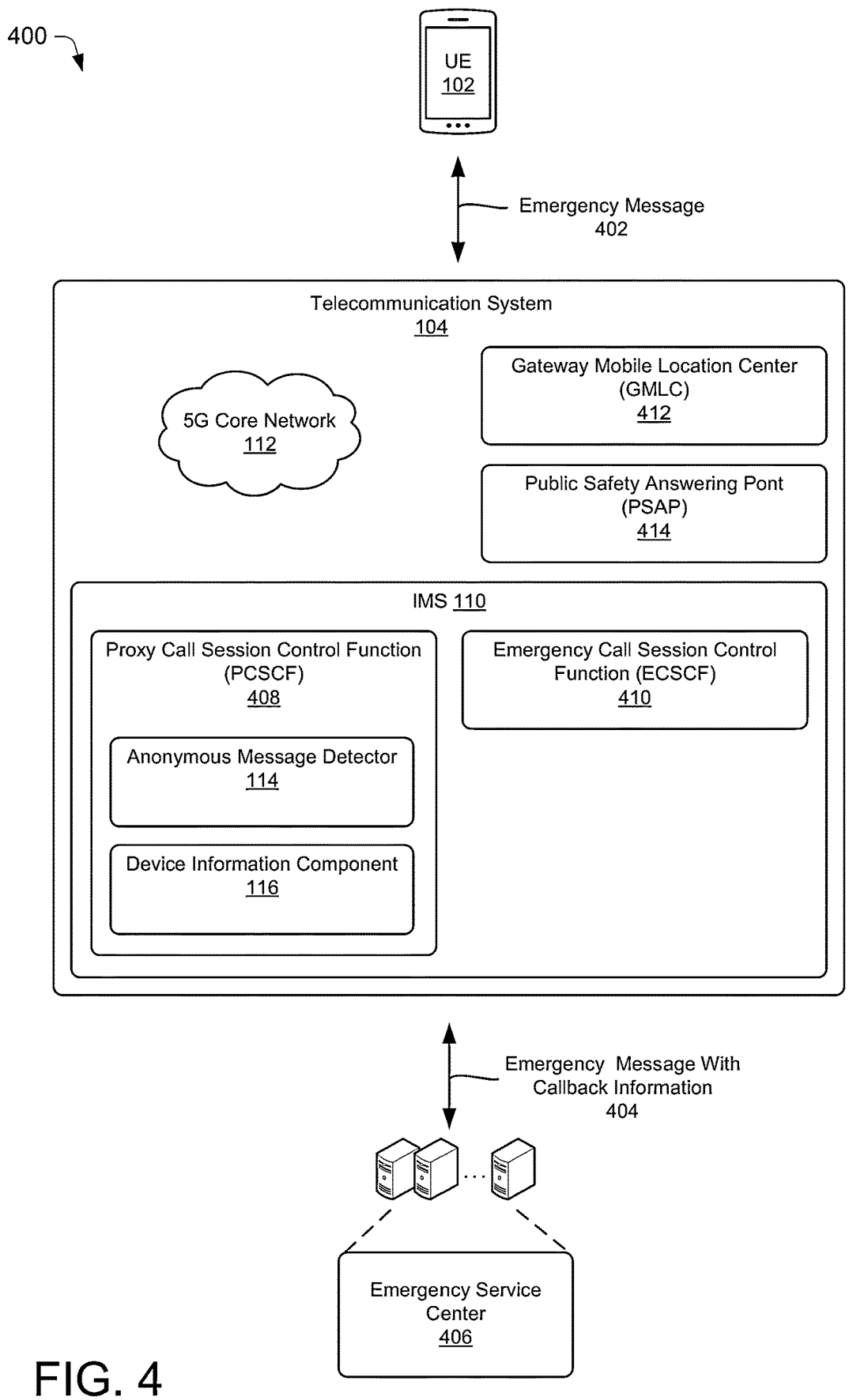
FIG. 4 depicts another example network environment in which an example user equipment can connect to a telecommunication system that includes an example server to implement the techniques described herein.

FIG. 4 depicts another example network environment 400 in which an example user equipment can connect to a telecommunication system that includes an example server to implement the techniques described herein. For example, the UE 102 can send an emergency message 402 to the IMS 110 using the 5G core network 112. The IMS 110 can determine callback information (e.g., a phone number or other identifier for contacting the UE 102) and generate an emergency message with callback information 404 for sending to an emergency service center 406.

The IMS 110 includes a PCSCF 408 and an ECSCF 410. As depicted in FIG. 4, the PCSCF 408 includes the anonymous message detector 114 and the device information component 116. FIG. 4 further depicts the telecommunication system 104 including a GMLC 412 and a PSAP 414. In various examples, the PCSCF 408, the ECSCF 410, the GMLC 412, and the PSAP 414 can exchange data to establish a communication session between the UE 102 and the emergency service center 406 (or a device associated therewith). For instance, the PCSCF 408 can send a request for the callback information to the GMLC 412 based at least in part on detecting that the emergency message 402 is associated with an anonymous device (the UE 102). The PCSCF 408 can send the request to the GMLC 412 using a REST interface which the GMLC 412 interprets to access, identify, or otherwise determine the callback information. For instance, the GMLC 412 can communicate with one or more components to determine the callback information from memory responsive to receiving the request via the REST interface.

In some examples, the GMLC 412 can send the callback information to the PCSCF 408 and/or the ECSCF 410 for associating with the emergency message 402. In various examples, the PCSCF 408 can add, modify, or otherwise append the callback information to the emergency message 402 to form the emergency message with callback information 404. For example, the PCSCF 408 can send an invite message to the ECSCF 410 with a PAI header that includes the callback information. The ECSCF 410 can thereafter send an invite message with the callback message to the PSAP 414 which in turn sends the emergency message with callback information 404 to the emergency service center 406. For example, the PAI header can be used by the PSAP 414 to send the callback information to the emergency service center 406.

Figure 5:
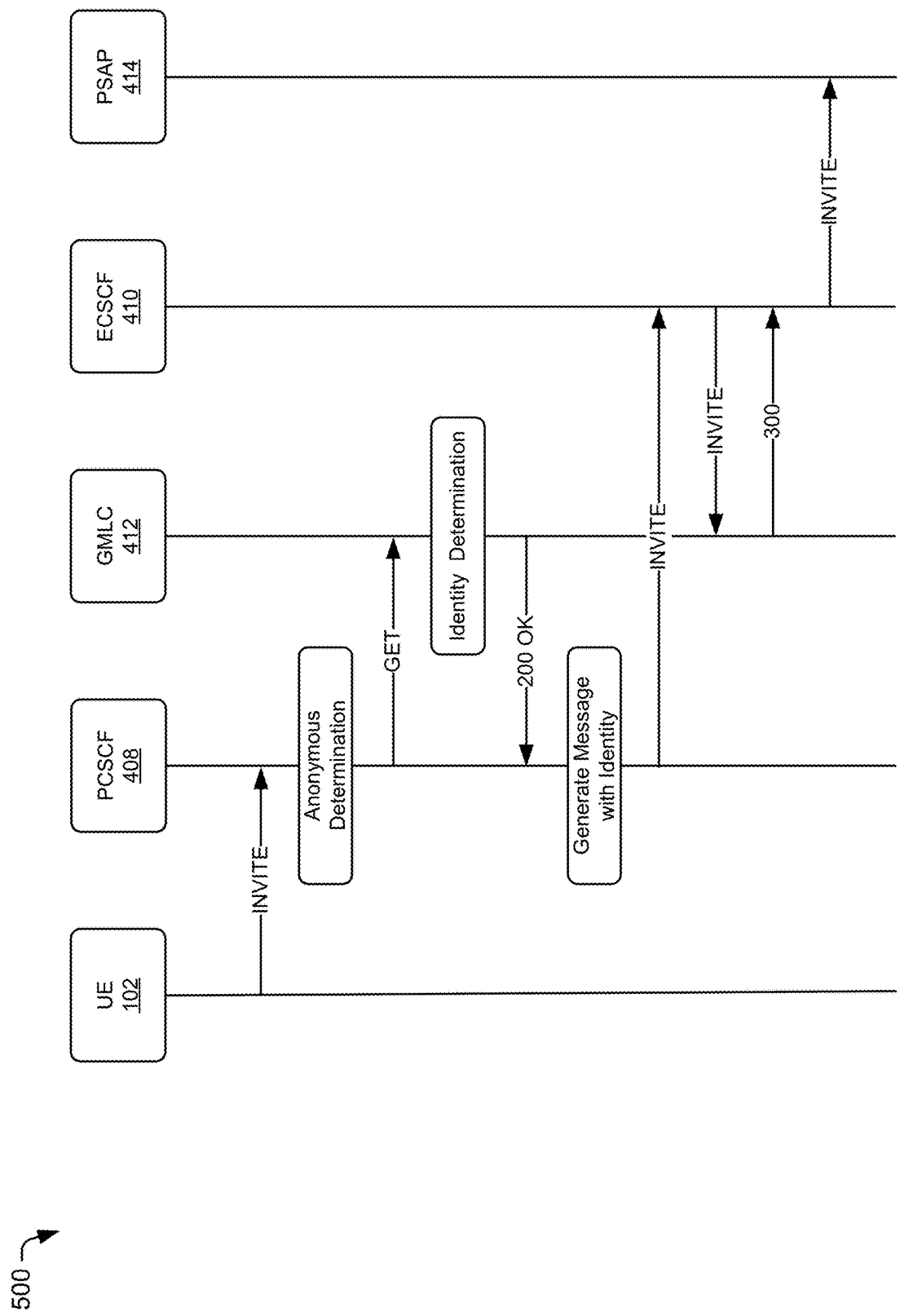
FIG. 5 depicts a messaging flow during an example call setup through an example Proxy Call Session Control Function (PCSCF).

FIG. 5 depicts a messaging flow 500 during an example call setup through an example Proxy Call Session Control Function (PCSCF). In some examples, the messaging flow 500 as shown in FIG. 5 can represent activity to determine device information by the PCSCF 408 during the establishing of a communication (e.g., the emergency message 402, the emergency message with callback information 404) between the UE 102 and the PSAP 414. For example, the UE 102 can initiate a message for sending to the PSAP 414, and the PCSCF 408 can provide callback information to the PSAP 414 based at least in part on data exchanged with the GMLC 412 and the ECSCF 410.

In some examples, the message flow 500 can include messaging associated with the IMS 110, such as a Session Initiation Protocol (SIP) messaging flow, while in other examples the message flow can represent a messaging flow that does not include communications with the IMS 110. In other words, while shown as being implemented by the PCSCF 408 in FIG. 5, in other examples, the message flow 500 can be implemented by the anonymous message detector 114 and the device information component 116 included in the telecommunication system 104 outside of the IMS 110.

The message flow 500 as shown in FIG. 5 can include the UE 102 sending an invite message to the PCSCF 408. The invite message can be associated with, for example, one of: the anonymous message 108, the message 302, or the emergency message 402. The PCSCF 408 can determine that the invite message is associated with an anonymous UE based at least in part on information included in the invite message and/or by processing the message by the IMS 110. For example, the PCSCF 408 can determine that the UE 102 is roaming or otherwise unable to register with the IMS 110.

Based on identifying that the UE is associated with an anonymous status, the PCSCF 408 can send a get message to the GMLC 412 to query the GMLC 412 for device information, callback information, and the like. For example, the PCSCF 408 can send the get message over a REST interface to request an identifier (e.g., a Mobile Station Integrated Services Digital Network (MSISDN) and/or an International Mobile Subscriber Identity (IMSI)) usable for initiating a call with an anonymous UE (the UE 102).

Responsive to receiving the get message, the GMLC 412 can access or determine the identifier, and send the identifier to the PCSCF 408 over the REST interface as a 200 OK message. That is, the REST interface can include the MSISDN, the IMSI, or other data identifying the UE 102. The message flow 500 can also include the PCSCF 408 sending an invite to the ECSCF 410 that includes the identifier information in a P-Asserted ID (PAI) header. Though the message flow 500 is associated with the ECSCF 410, in other examples the invite message with the PAI header can be sent from the PCSCF 408 to a call session control function (CSCF) server to establish anon-emergency call with another UE other than the PSAP 414.

The message flow 500 can also include the ECSCF 410 sending an invite message to the GMLC 412 which returns a 300 message. For instance, the GMLC 412 can receive the invite message from the ECSCF 410 causing the GMLC 412 to determine an emergency services routing key (ESRK) and an emergency services routing number (ESRN). For example, the GMLC 412 can determine the ESRK and the ESRN based at least in part on the MSISDN and/or the IMSI, and send the ESRK and the ESRN to the ECSCF 410 as part of the 300 message to enable the PSAP 414 with information for contacting the UE 102. Generally, the ESRK can represent a key to query a location of the UE 102 while the ESRN can represent a routing number for the ECSCF 410 to route message(s) to the PSAP 414.

Upon receiving the 300 message from the GMLC 412, the ECSCF 410 sends an invite message with the PAI header that includes the identifier information to the PSAP 414. In this way, the PSAP 414 can receive the MSISDN, the IMSI, or other data identifying the UE 102. An emergency service center associated with the PSAP 414 (e.g., the emergency service center 406) can receive the identifier information from the PSAP 414 to enable a callback from the emergency service center to the UE 102 in the event that the communication session between the UE 102 and the emergency service center ends prematurely (e.g., ends independent of receiving a termination request from the UE 102).

Figure 6:
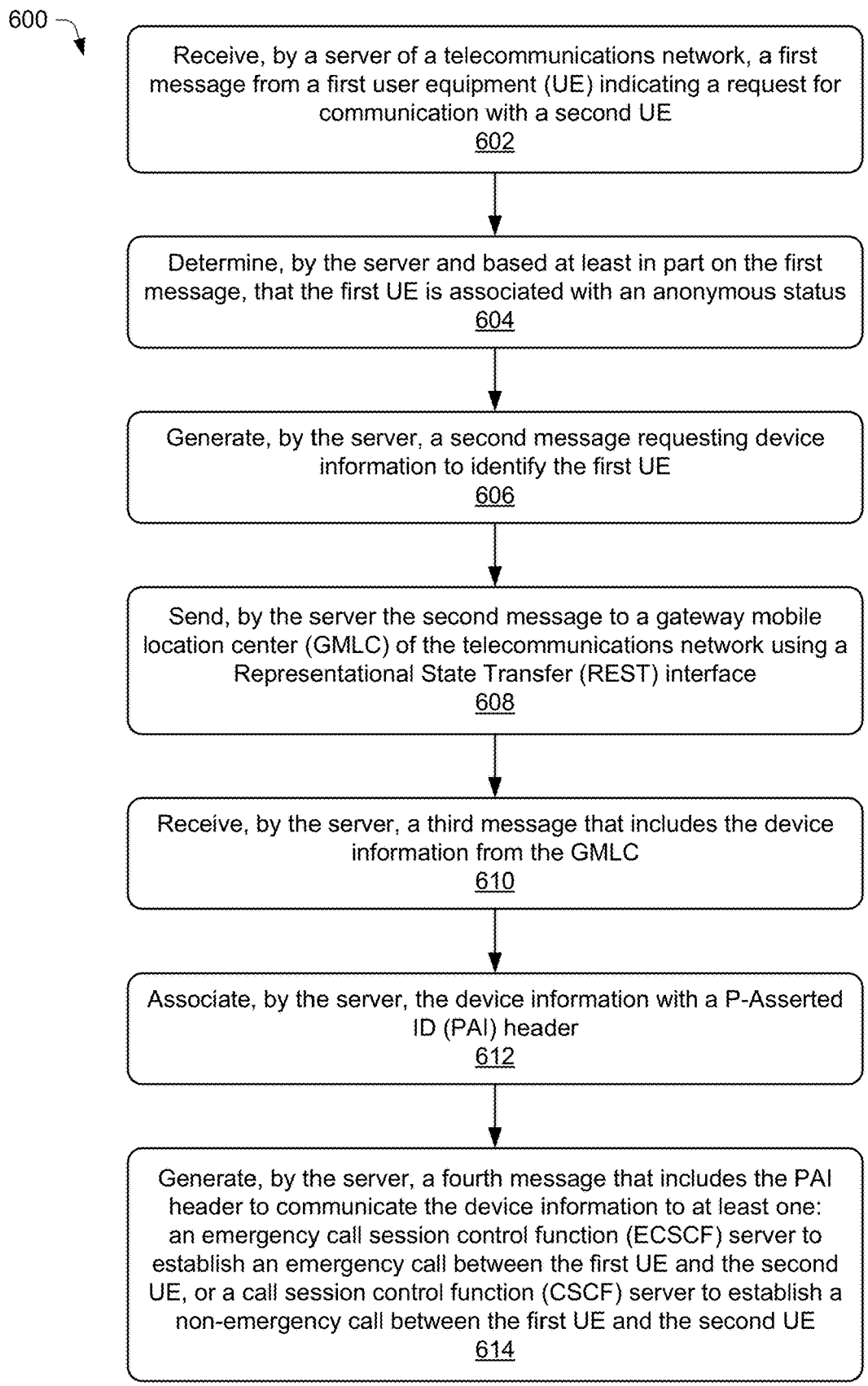
FIG. 6 depicts a flowchart of an example process for determining device information of an example user equipment during a call setup process by a telecommunication system.

FIG. 6 depicts a flowchart of an example process 600 for determining device information of an example user equipment during a call setup process by a telecommunication system. Some or all of the process 600 may be performed by one or more components in FIGS. 1-5, as described herein. For example, some or all of process 600 may be performed by the IMS 110 that includes the PCSCF 408 and/or the GMLC 412.

At operation 602, the process may include receiving, by a server of a telecommunications network, a first message from a first user equipment (UE) indicating a request for communication with a second UE. In some examples, the operation 602 may include the IMS 110 of the telecommunication system 104 receiving a message from the UE 102 to initiate a communication session with another UE, such as a device associated with the PSAP 414. In various examples, the message can comprise one of the anonymous message 108, the message 302, or the emergency message 402. For instance, the UE 102 can initiate sending the emergency message 402 comprising an image, a video, and/or a file transfer to an emergency service center (e.g., a 911 Center) associated with the PSAP (e.g., PSAP 414).

At operation 604, the process may include determining, by the server and based at least in part on the first message, that the first UE is associated with an anonymous status. In some examples, the operation 604 may include the IMS 110 implementing an anonymous message detector 114 to intercept, detect, and/or identify an anonymous status associated with the UE 102. In various examples, determining the anonymous status can be based at least in part on information associated with the first message (e.g., information in a header can indicate that the UE is roaming or be used by the IMS 110 to determine that the UE 102 is anonymous). Using the techniques described herein, the IMS 110 can exchange data with a subscriber database, or other component, to determine whether or not the first device is associated with an anonymous status.

At operation 606, the process may include generating, by the server, a second message requesting device information to identify the first UE. In some examples, the operation 606 may include the IMS 110 generating a request for device information (e.g., the device information request 304) for sending to the device information component 116 (e.g., the GMLC 412). In various examples, generating the second message can include selecting an interface from available interface types usable for sending the second message. In one specific example, the IMS 110 can generate the request for device information for sending using a Representational State Transfer (REST) interface selected from available interface types.

At operation 608, the process may include sending, by the server the second message requesting device information to a gateway mobile location center (GMLC) of the telecommunications network using a Representational State Transfer (REST) interface. In some examples, the operation 608 may include the IMS 110 sending a request for a device information associated with the first device to a GMLC (e.g., the GMLC 412). The device information can represent a phone number, subscriber number, or other identifier of the UE 102. In one specific example, the second message can be sent using the REST interface to request the device information such as an MSISDN and/or an IMSI.

At operation 610, the process may include receiving, by the server, a third message that includes the device information from the GMLC. In some examples, the operation 610 may include the IMS 110 receiving the device information from the GMLC 412 based at least in part on the GMLC 412 receiving the request from the IMS 110. For example, the GMLC 412 can send the device information to the IMS 110 (or a PCSCF associated therewith) using the REST interface.

At operation 612, the process may include associating, by the server, the device information with a P-Asserted ID (PAI) header. In some examples, the operation 612 may include the IMS 110 including or otherwise determining the PAI header for sending the device information as part of a subsequent message. In various examples, associating the device information and the PAI header can include identifying a PAI header for appending the device information.

At operation 614, the process may include generating, by the server, a fourth message that includes the PAI header to communicate the device information to at least one: an emergency call session control function (ECSCF) server to establish an emergency call between the first UE and the second UE, or a call session control function (CSCF) server to establish a non-emergency call between the first UE and the second UE. In some examples, the operation 614 may include the IMS 110 generating an invite message to the ECSCF 410 or the CSCF to establish a communication session with the PSAP (when sent to the ECSCF 410) or another UE other than the PSAP (when sent to the CSCF). In such examples, the invite message can include generating the fourth message for sending the device information in the PAI header to communicate the identity of the UE 102 which may be subsequently forwarded from the ECSCF or the CSCF to a terminating device.

Figure 7:
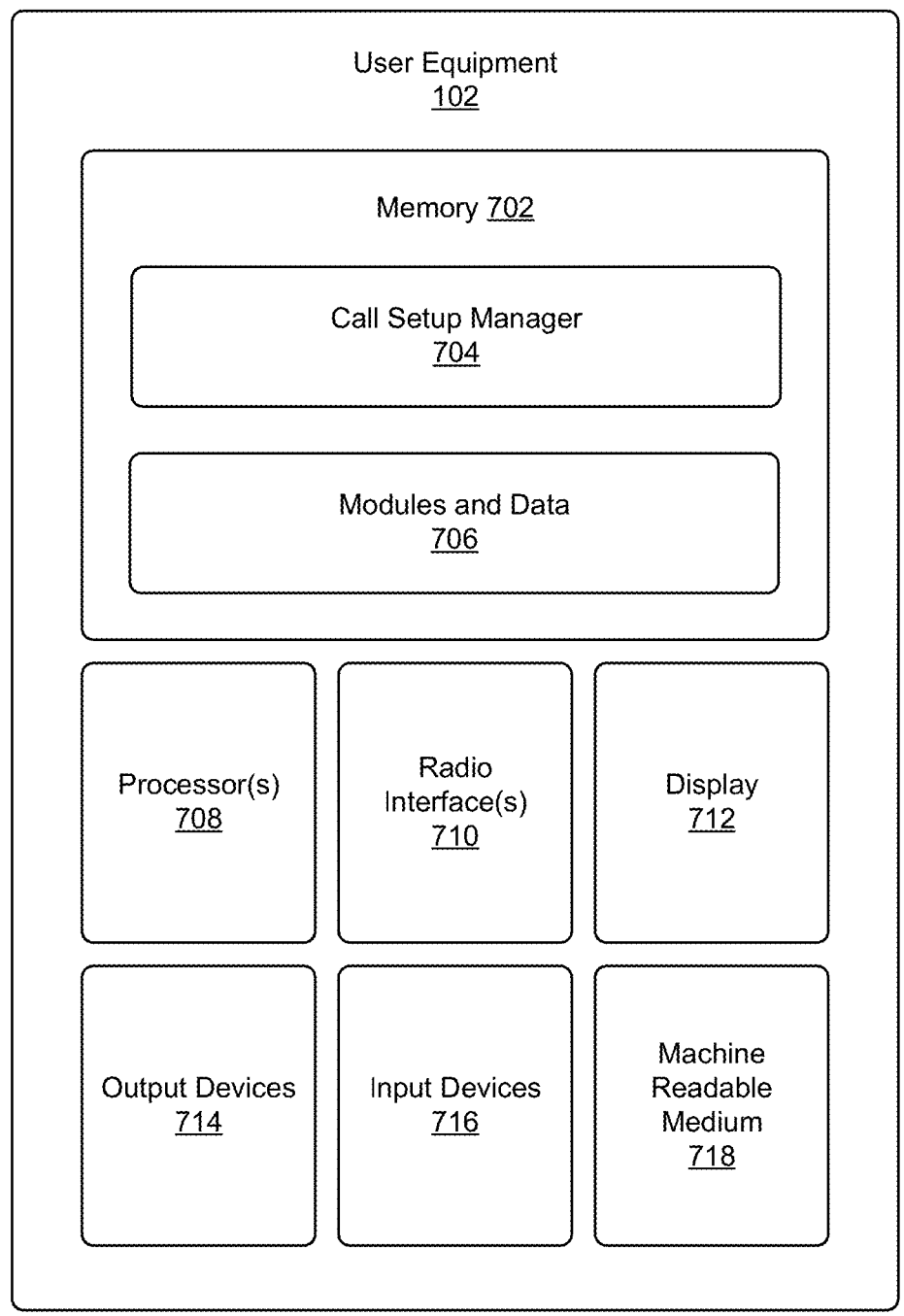
FIG. 7 depicts an example system architecture for a user equipment.

FIG. 7 depicts an example system architecture for a UE 102, in accordance with various examples. As shown, a UE 102 can have memory 702 storing a call setup manager 704, and other modules and data 706. A UE 102 can also comprise processor(s) 708, radio interfaces 710, a display 712, output devices 714, input devices 716, and/or a machine readable medium 718.

In various examples, the memory 702 can include system memory, which may be volatile (such as RAM), non-volatile (such as ROM, flash memory, etc.) or some combination of the two. The memory 702 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 704 can send and/or receive messages comprising RCS service including SIP messages associated with setup and management of a call session via the IMS 110. The SIP messages can include any of the SIP messages shown in FIGS. 5 and 6, and/or other SIP messages.

The other modules and data 706 can be utilized by the UE 102 to perform or enable performing any action taken by the UE 102. The modules and data 706 can include a UE platform, operating system, and applications, and data utilized by the platform, operating system, and applications.

In various examples, the processor(s) 708 can be a central processing unit (CPU), a graphics processing unit (GPU), or both CPU and GPU, or any other type of processing unit. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 may also be responsible for executing all computer applications stored in the memory 702, which can be associated with common types of volatile (RAM) and/or nonvolatile (ROM) memory.

The radio interfaces 710 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 710 can be compatible with multiple radio access technologies, such as 5G radio access technologies and 4G/LTE radio access technologies. Accordingly, the radio interfaces 710 can allow the UE 102 to connect to the telecommunication system 104 as described herein.

The display 712 can be a liquid crystal display or any other type of display commonly used in UEs 102. For example, display 712 may be a touch-sensitive display screen, and can then also act as an input device or keypad, such as for providing a soft-key keyboard, navigation buttons, or any other type of input. The output devices 714 can include any sort of output devices known in the art, such as the display 712, speakers, a vibrating mechanism, and/or a tactile feedback mechanism. Output devices 714 can also include ports for one or more peripheral devices, such as headphones, peripheral speakers, and/or a peripheral display. The input devices 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 718 can store one or more sets of instructions, such as software or firmware, that embodies any one or more of the methodologies or functions described herein. The instructions can also reside, completely or at least partially, within the memory 702, processor(s) 708, and/or radio interface(s) 710 during execution thereof by the UE 102. The memory 702 and the processor(s) 708 also can constitute machine readable media 718.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving, by a server of a telecommunications network, a first message from a first user equipment (UE) indicating a request for communication with a second UE, wherein the server is a Proxy Call Session Control Function (PCSCF) server of an Internet Protocol (IP) Multimedia Subsystem (IMS);
determining, by the server and based at least in part on the first message, that the first UE is associated with an anonymous status;
generating, by the server, a second message requesting device information to identify the first UE;
sending, by the server the second message to a gateway mobile location center (GMLC) of the telecommunications network using a Representational State Transfer (REST) interface, wherein the second message is transmitted in accordance with the REST interface to communicate the request for the device information to the GMLC;
receiving, by the server, a third message that includes the device information from the GMLC;
associating, by the server, the device information with a P-Asserted ID (PAI) header; and
generating, by the server, a fourth message that includes the PAI header to communicate the device information to at least one:
an emergency call session control function (ECSCF) server to establish an emergency call between the first UE and the second UE, or
a call session control function (CSCF) server to establish a non-emergency call between the first UE and the second UE.

2. The system of claim 1, wherein:
the device information comprises a first identifier that identifies the first UE and a second identifier that identifies a subscriber of the first UE.

3. The system of claim 2, wherein:
the first identifier is a Mobile Station Integrated Services Digital Network (MSISDN), and
the second identifier is an International Mobile Subscriber Identity (IMSI).

4. The system of claim 1, the operations further comprising:
receiving, by the GMLC, a fifth message representing an invite message from the ECSCF, the invite message including the device information;
determining, by the GMLC and based at least in part on receiving the fifth message, an emergency services routing key (ESRK) and an emergency services routing number (ESRN); and
sending, by the GMLC, the ESRK and the ESRN to the ECSCF to enable a Public Service Answering Point to identify a number to contact the first UE.

5. The system of claim 1, wherein:
the telecommunications network is a host telecommunications network,
the first UE is operating outside a coverage area of a home telecommunications network, and
the fourth message represents an invite message to establish a communication session using the host telecommunications network.

6. A method comprising:
receiving, by a server of a telecommunications network, a first message from a first user equipment (UE) to establish a communication session with a second UE;
determining, by the server and based at least in part on the first message, that the first UE is associated with an anonymous status;
sending, by the server and based at least in part on a Representational State Transfer (REST) interface, a second message to a gateway mobile location center (GMLC) of the telecommunications network, the second message requesting device information;
receiving, by the server and from the GMLC, a third message comprising the device information identifying a contact number for the first UE;
generating, by the server, a fourth message for sending to the second UE that includes the device information;
sending, by the server, the fourth message representing a first invite to one of: an emergency call session control function (ECSCF) server to establish an emergency call between the first UE and the second UE or a call session control function (CSCF) server to establish a non-emergency call between the first UE and the second UE;
receiving, by the server and from the ECSCF or the CSCF, a fifth message representing a second invite;
determining, by the server and based at least in part on receiving the fifth message, a routing key or a routing number; and
sending, by the server, the routing key or the routing number to the ECSCF or the CSCF to enable the second UE to callback the first UE if the emergency call or the non-emergency call ends independent of receiving a termination request from the first UE.

7. The method of claim 6, further comprising:
sending, by the server, the fourth message to the second UE to establish a first communication session between the first UE and the second UE;
establishing, based at least in part on the fourth message, the first communication session between the first UE and the second UE;
determining that the first communication session ends independent of receiving a termination request from the first UE; and
receiving a sixth message from the second UE to establish a second communication session between the first UE and the second UE based at least in part on the contact number for the first UE included in the fourth message.

8. The method of claim 6, wherein:
sending the second message requesting device information to the GMLC comprises sending the second message in the REST interface.

9. The method of claim 6, wherein:
the second UE is a Public Service Answering Point.

10. The method of claim 6, wherein:
generating the fourth message comprises appending the device information in a P-Asserted ID (PAI) header as part of a call setup process.

11. The method of claim 6, wherein:
the server is a Proxy Call Session Control Function (PCSCF) server of an Internet Protocol (IP) Multimedia Subsystem (IMS).

12. The method of claim 6, wherein:
the telecommunications network is a host telecommunications network;
the first UE sends the first message using the host telecommunications network while outside a coverage area of a home telecommunications network, and
the fourth message represents an invite message to establish a communication session with the second UE using the host telecommunications network.

13. The method of claim 6, wherein:
the contact number comprises a Mobile Station Integrated Services Digital Network (MSISDN) or an International Mobile Subscriber Identity (IMSI).

14. One or more non-transitory computer-readable media storing instructions executable by one or more processors, wherein the instructions, when executed, cause the one or more processors to perform operations comprising:
receiving, by a server of a telecommunications network, a first message from a first user equipment (UE) to establish a communication session with a second UE;
determining, by the server and based at least in part on the first message, that the first UE is associated with an anonymous status;
sending, by the server and based at least in part on a Representational State Transfer (REST) interface, a second message to a gateway mobile location center (GMLC) of the telecommunications network, the second message requesting device information;
receiving, by the server and from the GMLC, a third message comprising the device information identifying a contact number for the first UE;
generating, by the server, a fourth message for sending to the second UE that includes the device information;
sending, by the server, the fourth message representing a first invite to one of: an emergency call session control function (ECSCF) server to establish an emergency call between the first UE and the second UE or a call session control function (CSCF) server to establish a non-emergency call between the first UE and the second UE;
receiving, by the server and from the ECSCF or the CSCF, a fifth message representing a second invite;
determining, by the server and based at least in part on receiving the fifth message, a routing key or a routing number; and
sending, by the server, the routing key or the routing number to the ECSCF or the CSCF to enable the second UE to callback the first UE if the emergency call or the non-emergency call ends independent of receiving a termination request from the first UE.

15. The one or more non-transitory computer-readable media of claim 14, the operations further comprising at least one of:
sending, by the server, the fourth message to the second UE to establish a first communication session between the first UE and the second UE;
establishing, based at least in part on the fourth message, the first communication session between the first UE and the second UE;
determining that the first communication session ends independent of receiving a termination request from the first UE; or
receiving a sixth message from the second UE to establish a second communication session between the first UE and the second UE based at least in part on the contact number for the first UE included in the fourth message.

16. The one or more non-transitory computer-readable media of claim 14, wherein:
the contact number comprises a Mobile Station Integrated Services Digital Network (MSISDN) or an International Mobile Subscriber Identity (IMSI).

17. The one or more non-transitory computer-readable media of claim 14, wherein:
the server is a Proxy Call Session Control Function (PCSCF) server of an Internet Protocol (IP) Multimedia Subsystem (IMS).

* * * * *